US012779886B2

(12) United States Patent
Choi et al.

(10) Patent No.: US 12,779,886 B2
(45) Date of Patent: Nov. 3, 2026

(54) DROPLET APPLICATION DEVICE AND DROPLET APPLICATION METHOD

(71) Applicant: SEMES CO., LTD., Cheonan-si (KR)

(72) Inventors: Sung Ho Choi, Cheonan-si (KR); Ji Eun Yi, Seoul (KR); Jun Woo Lee, Cheonan-si (KR)

(73) Assignee: Semes Co., LTD., Cheonan-si (KR)

( * ) Notice: Subject to any disclaimer, the term of this patent is extended or adjusted under 35 U.S.C. 154(b) by 145 days.

(21) Appl. No.: 18/394,796

(22) Filed: Dec. 22, 2023

(65) Prior Publication Data

US 2024/0239121 A1 Jul. 18, 2024

(30) Foreign Application Priority Data

Jan. 17, 2023 (KR) ........................ 10-2023-0006779

(51) Int. Cl.
*B41J 29/393* (2006.01)
*B41J 2/21* (2006.01)

(52) U.S. Cl.
CPC ........... *B41J 29/393* (2013.01); *B41J 2/2135* (2013.01); *B41J 2029/3935* (2013.01)

(58) Field of Classification Search
CPC .................... B41J 29/393; B41J 2/2135; B41J 2029/3935; B41J 2/2132; B41J 2/01; B41J 15/04; B41J 3/543; B41M 5/0047; H10P 72/0448; H10P 72/0616
See application file for complete search history.

(56) References Cited

U.S. PATENT DOCUMENTS

2023/0094912 A1 * 3/2023 Hyun .................... B41J 29/393 427/58

FOREIGN PATENT DOCUMENTS

JP 5297144 B2 9/2013
JP 7114452 B2 8/2022
KR 10-2019-0118007 A 10/2019
WO WO-2010090080 A1 * 8/2010 .......... B41J 2/16579

* cited by examiner

*Primary Examiner* — Jannelle M Lebron
(74) *Attorney, Agent, or Firm* — Harness, dickey & Pierce, P.L.C.

(57) ABSTRACT

Provided are a droplet application device and a droplet application method, which check printing states for at least two directions when printing a test pattern on a substrate to check deviation of the substrate and a nozzle alignment state of an inkjet head for at least two directions. The droplet application device includes: an inkjet system including an ink pack assembly which includes a plurality of inkjet heads and discharges ink from each of the inkjet heads onto a substrate to print a test pattern, a pack transfer part which transfers the ink pack assembly, and a substrate transfer part which transfers the substrate; and a vision inspection unit for determining an alignment state of the inkjet heads by inspecting print direction information of the test pattern printed on the substrate, in which the test pattern includes at least two print direction information.

17 Claims, 5 Drawing Sheets

DROPLET APPLICATION DEVICE AND DROPLET APPLICATION METHOD

CROSS-REFERENCE TO RELATED APPLICATIONS

This application claims priority to and the benefit of Korean Patent Application No. 10-2023-0006779 filed in the Korean Intellectual Property Office on Jan. 17, 2023 the entire contents of which are incorporated herein by reference.

TECHNICAL FIELD

The present invention relates to a droplet application device and a droplet application method, and more particularly to a droplet application device and a droplet application method for applying ink to a substrate.

BACKGROUND ART

The method of manufacturing display substrates, photovoltaic substrates, and semiconductor substrates using inkjet has the advantage that a pattern layer can be formed without the processes in the related art, such as deposition, exposure, and development, by simply performing printing with ink, so that in terms of manufacturing cost, it has the advantage of being able to manufacture a substrate at a relatively lower cost than other substrate manufacturing methods.

A droplet application device in the related art using an inkjet system applies ink to a substrate by transferring a substrate and an ink pack assembly in an ink pack assembly in which inkjet heads that apply the ink are combined.

In this case, each of the inkjet heads needs to be aligned without deviation with respect to the transfer direction of the ink pack assembly and the transfer direction of the substrate in order to apply ink to the correct location.

As a result, an inkjet system in the related art prints a test pattern on a dummy substrate and inspects the test pattern with a vision system to check for substrate deviation or nozzle alignment state of the inkjet head.

However, because the test patterns in the related art are formed in a line, there is a problem in that reliability for inspecting the substrate or the nozzle alignment state of the inkjet head is very low.

SUMMARY OF THE INVENTION

An technical object of the present invention to solve the foregoing problems is to provide a droplet application device and a droplet application method which check printing states for at least two directions when printing a test pattern on a substrate to check deviation of the substrate and a nozzle alignment state of an inkjet head for at least two directions.

Another technical object of the present invention to solve the foregoing problems is to provide a droplet application device and a droplet application method which check the deviation of a substrate and a nozzle alignment state of an inkjet head in at least two directions for each case of printing a pattern on a substrate that is moving forward and printing a pattern on a substrate that is moving in reverse.

The object of the present invention is not limited thereto, and other objects not mentioned will be clearly understood by those of ordinary skill in the art from the following description.

An exemplary embodiment of the present invention provides a droplet application device including: an inkjet system including an ink pack assembly which includes a plurality of inkjet heads and discharges ink from each of the inkjet heads onto a substrate to print a test pattern, a pack transfer part which transfers the ink pack assembly, and a substrate transfer part which transfers the substrate; and a vision inspection unit for determining an alignment state of the inkjet heads by inspecting print direction information of the test pattern printed on the substrate, in which the test pattern includes at least two print direction information.

According to the exemplary embodiment, test pattern includes a forward pattern formed when the substrate transfer part transfers the substrate in one direction.

According to the exemplary embodiment, the forward pattern includes a first print direction information pattern formed in a direction in which the substrate transfer part transfers the substrate.

According to the exemplary embodiment, the first print direction information pattern is formed by aligning dots in a row in the direction in which the substrate is transferred.

According to the exemplary embodiment, the forward pattern further includes a second print direction information pattern formed in a direction in which the pack transfer part transfers the ink pack assembly.

According to the exemplary embodiment, the second print direction information pattern is formed by aligning dots in a row in the direction in which the ink pack assembly is transferred.

According to the exemplary embodiment, the vision inspection unit forms a first reference line for a movement direction of the ink pack assembly and a second reference line for a movement direction of the substrate transfer part to be perpendicular to the first reference line, and calculates a deviation amount by comparing a line connecting centers of dots forming the first print direction information pattern with the first reference line, and calculates a deviation amount by comparing a line connecting centers of dots forming the second print direction information pattern with the second reference line to inspect deviation of each of the inkjet heads.

According to the exemplary embodiment, the forward pattern further includes a first substrate direction pattern that includes information about a movement direction of the substrate when the substrate is transferred in one direction, and is formed on one side of the first print direction information pattern.

According to the exemplary embodiment, the forward pattern further includes a second substrate direction pattern that includes information about a movement direction of the substrate when the substrate is transferred in one direction, and is formed on one side of the second print direction information pattern.

According to the exemplary embodiment, the first print direction information pattern is formed by arranging the dots in at least two rows, and the forward pattern further includes a first head information pattern formed between the first print direction information patterns.

According to the exemplary embodiment, a total length of dots forming the first head information pattern is formed to be less than a total length of dots forming the first print direction information pattern.

According to the exemplary embodiment, the test pattern further includes a reverse pattern formed when the substrate transfer part transfers the substrate in the other direction.

According to the exemplary embodiment, the forward pattern is formed when the substrate is transferred forward by the substrate transfer part, and the reverse pattern is formed when the substrate is transferred in reverse by the substrate transfer part.

According to the exemplary embodiment, the reverse pattern includes a third print direction information pattern that is formed toward the direction in which the substrate transfer part transfers the substrate, and formed by aligning dots in a row in the direction in which the substrate is transferred.

According to the exemplary embodiment, the forward pattern further includes a fourth print direction information pattern that is formed toward the direction in which the pack transfer part transfers the ink pack assembly and formed by aligning dots in a row in the direction in which the ink pack assembly is transferred.

According to the exemplary embodiment, the vision inspection unit forms a third reference line for a movement direction of the ink pack assembly and a fourth reference line for a movement direction of the substrate transfer part to be perpendicular to the third reference line, and calculates a deviation amount by comparing a line connecting centers of dots forming the third print direction information pattern with the third reference line, and calculates a deviation amount by comparing a line connecting centers of dots forming the fourth print direction information pattern with the fourth reference line to inspect deviation of each of the inkjet heads.

According to the exemplary embodiment, the reverse pattern further includes a third substrate direction pattern that includes information about a movement direction of the substrate when the substrate is transferred in one direction and is formed on one side of the third print direction information pattern, and a fourth substrate orientation pattern that includes information about a movement direction of the substrate when the substrate is transferred in one direction and is formed on one side of the fourth print direction information pattern.

According to the exemplary embodiment, the third print direction information pattern is formed by arranging the dots in at least two rows, and the reverse pattern further includes a second head information pattern formed between the third print direction information patterns.

Another exemplary embodiment of the present invention provides a droplet application method including: a substrate placement operation of placing a substrate transfer part on a substrate; a forward transfer operation of transferring, by the substrate transfer part, the substrate in one direction; a first printing operation of discharging ink from each of inkjet heads of an ink pack assembly to print a forward pattern including information about a transfer direction of the substrate and a transfer direction of the ink pack assembly; a reverse transfer operation of transferring, by the substrate transfer part, the substrate in the other direction; a second printing operation of discharging ink from each of the inkjet heads of the ink pack assembly to print a reverse pattern including information about the transfer direction of the substrate and the transfer direction of the ink pack assembly; and a pattern inspection operation of inspecting, by a vision inspection unit, the forward pattern and the reverse pattern to check an alignment state of the inkjet head and an alignment state of the substrate.

Still another exemplary embodiment of the present invention provides a droplet application device including: an inkjet system including an ink pack assembly which includes a plurality of inkjet heads and discharges ink from each of the inkjet heads onto a substrate to print a test pattern, a pack transfer part which transfers the ink pack assembly, and a substrate transfer part which transfers the substrate; and a vision inspection unit for determining an alignment state of the inkjet heads by inspecting print direction information of the test pattern printed on the substrate, in which the test pattern includes a forward pattern and a reverse pattern, and the forward pattern includes a first print direction information pattern formed in a direction in which the substrate transfer part transfers the substrate and formed by aligning dots in a row in the direction in which the substrate is transferred, a second print direction information pattern formed in a direction in which the pack transfer part transfers the ink pack assembly and formed by aligning dots in a row in the direction in which the inkpack assembly is transferred, a first substrate direction pattern that includes information about a movement direction of the substrate when the substrate is transferred in one direction, and is formed on one side of the first print direction information pattern, a second substrate direction pattern that includes information about a movement direction of the substrate when the substrate is transferred in one direction, and is formed on one side of the second print direction information pattern, and a first head information pattern formed between two rows of dots of the first print direction information pattern, in which a total length of dots forming the first head information pattern is formed to be less than a total length of dots forming the first print direction information pattern, the reverse pattern includes a third print direction information pattern that is formed toward the direction in which the substrate transfer part transfers the substrate, and formed by aligning dots in two rows in the direction in which the substrate is transferred, a fourth print direction information pattern that is formed toward the direction in which the pack transfer part transfers the ink pack assembly and formed by aligning dots in a row in the direction in which the ink pack assembly is transferred, a third substrate direction pattern that includes information about a movement direction of the substrate when the substrate is transferred in one direction and is formed on one side of the third print direction information pattern, a fourth substrate orientation pattern that includes information about a movement direction of the substrate when the substrate is transferred in one direction and is formed on one side of the fourth print direction information pattern, and a second head information pattern formed between two rows of dots of the third print direction information pattern, in which a total length of dots forming the second head information pattern is formed to be less than a total length of dots forming the third print direction information pattern, the vision inspection unit forms a first reference line for the movement direction of the ink pack assembly and a second reference line for the movement direction of the substrate transfer part to be perpendicular to the first reference line, and calculates a deviation amount by comparing a line connecting the centers of the dots forming the first print direction information pattern with the first reference line, and calculates a deviation amount by comparing a line connecting the centers of the dots forming the second print direction information pattern with the second reference line to inspect deviation of each of the inkjet heads, and the vision inspection unit forms a third reference line for the movement direction of the ink pack assembly and a fourth reference line for the movement direction of the substrate transfer part to be perpendicular to the third reference line, and calculates a deviation amount by comparing a line connecting the centers of the dots forming the third print direction information pattern with the third reference line, and calculates a deviation amount by comparing a line connecting the centers of the dots forming the fourth print direction information pattern with the fourth reference line to inspect deviation of each of the inkjet heads.

The present invention has an effect of checking deviation of a substrate and a nozzle alignment state of an inkjet head for two or more directions by checking printing states for two or more directions when printing a test pattern on a substrate.

Further, the present invention has an effect of checking the deviation of a substrate and a nozzle alignment state of an inkjet head in two or more directions for each case of printing a pattern on a substrate that is moving forward and printing a pattern on a substrate that is moving in reverse.

The effect of the present invention is not limited to the foregoing effects, and those skilled in the art may clearly understand non-mentioned effects from the present specification and the accompanying drawings.

DETAILED DESCRIPTION

Figure 1:
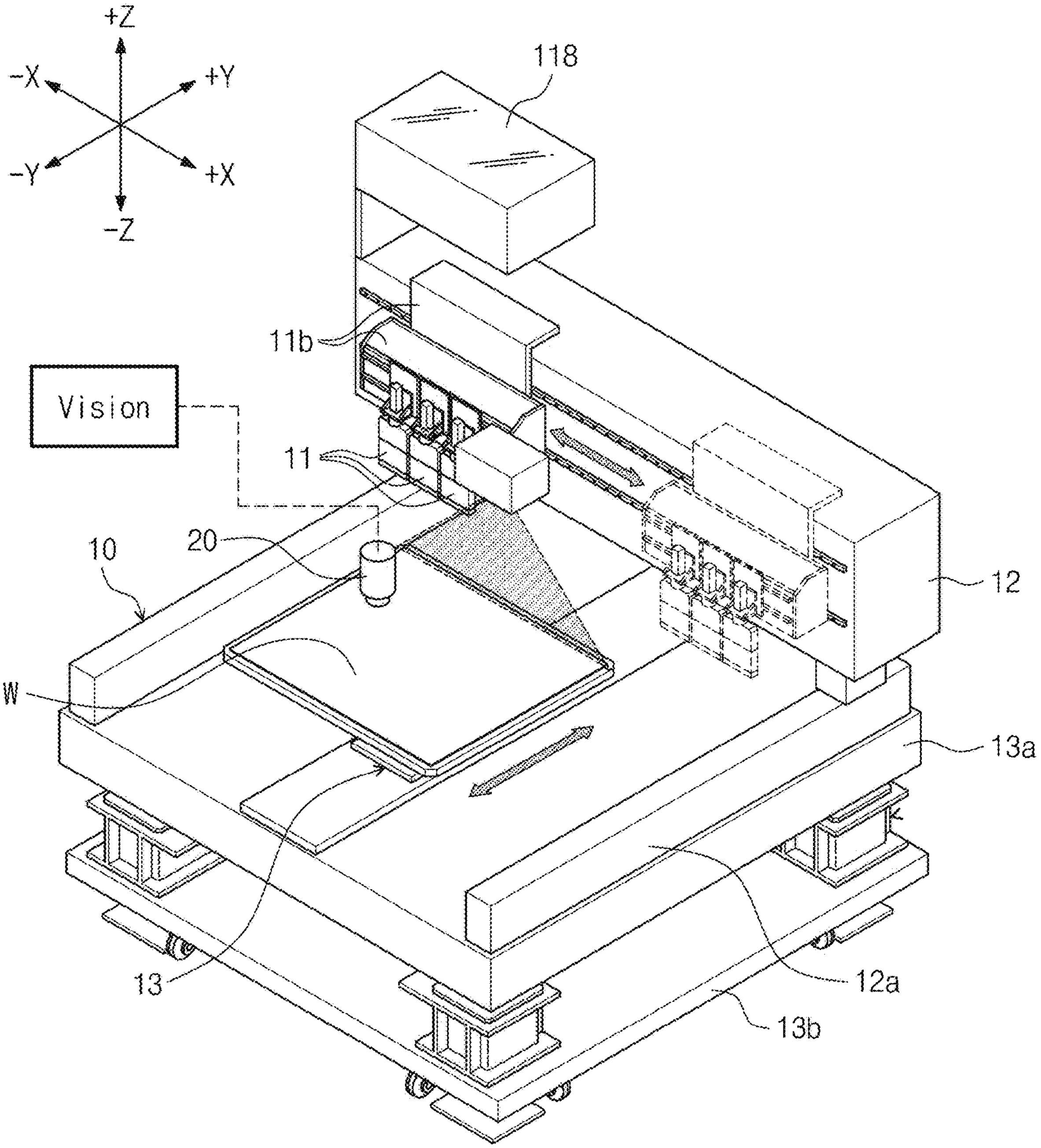
FIG. 1 is a perspective view of a droplet application device according to an exemplary embodiment of the present invention.

Example embodiments will now be described more fully with reference to the accompanying drawings. Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms “a,” “an,” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being “on,” “engaged to,” “connected to,” or “coupled to” another element or layer, it may be directly on, engaged, connected or coupled to the other element or layer, or intervening elements or layers may be present. In contrast, when an element is referred to as being “directly on,” “directly engaged to,” “directly connected to,” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner,” “outer,” “beneath,” “below,” “lower,” “above,” “upper,” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

When the term “same” or “identical” is used in the description of example embodiments, it should be understood that some imprecisions may exist. Thus, when one element or value is referred to as being the same as another element or value, it should be understood that the element or value is the same as the other element or value within a manufacturing or operational tolerance range (e.g., +10%).

When the terms “about” or “substantially” are used in connection with a numerical value, it should be understood that the associated numerical value includes a manufacturing or operational tolerance (e.g., +10%) around the stated numerical value. Moreover, when the words “generally” and “substantially” are used in connection with a geometric shape, it should be understood that the precision of the geometric shape is not required but that latitude for the shape is within the scope of the disclosure.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 2:
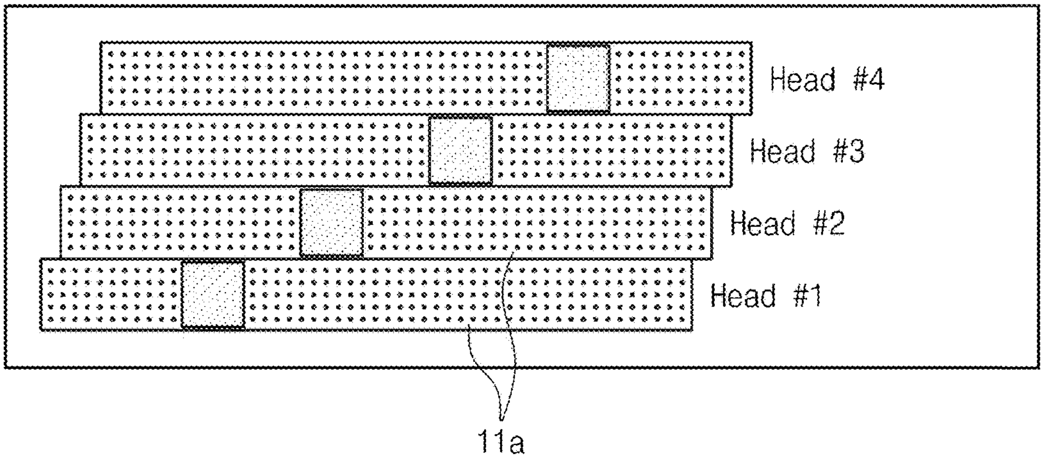
FIG. 2 is a bottom view of an ink pack within the ink pack assembly illustrated in FIG. 1.
Figure 3:
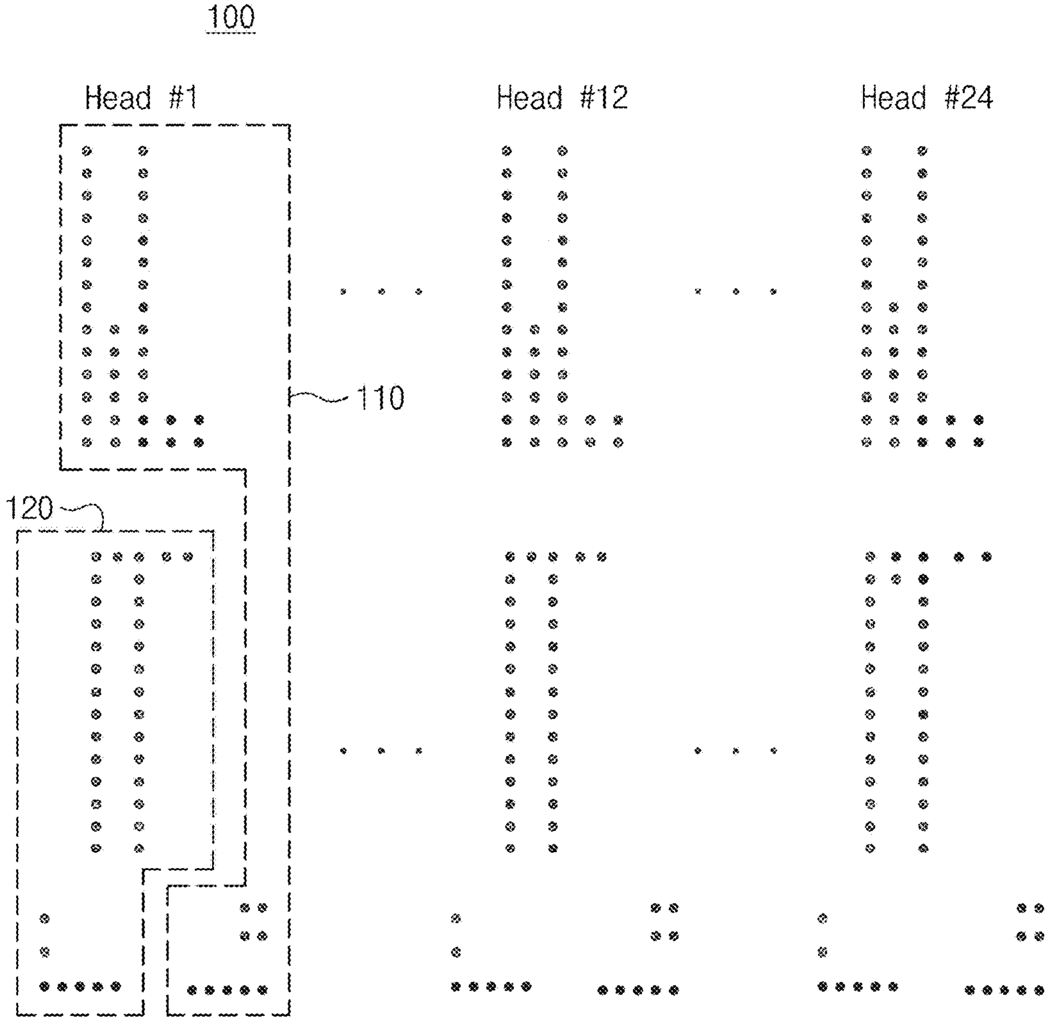
FIG. 3 is a top plan view of a test pattern being printed on a substrate illustrated in FIG. 1, enlarged by a vision inspection unit.
Figure 4:
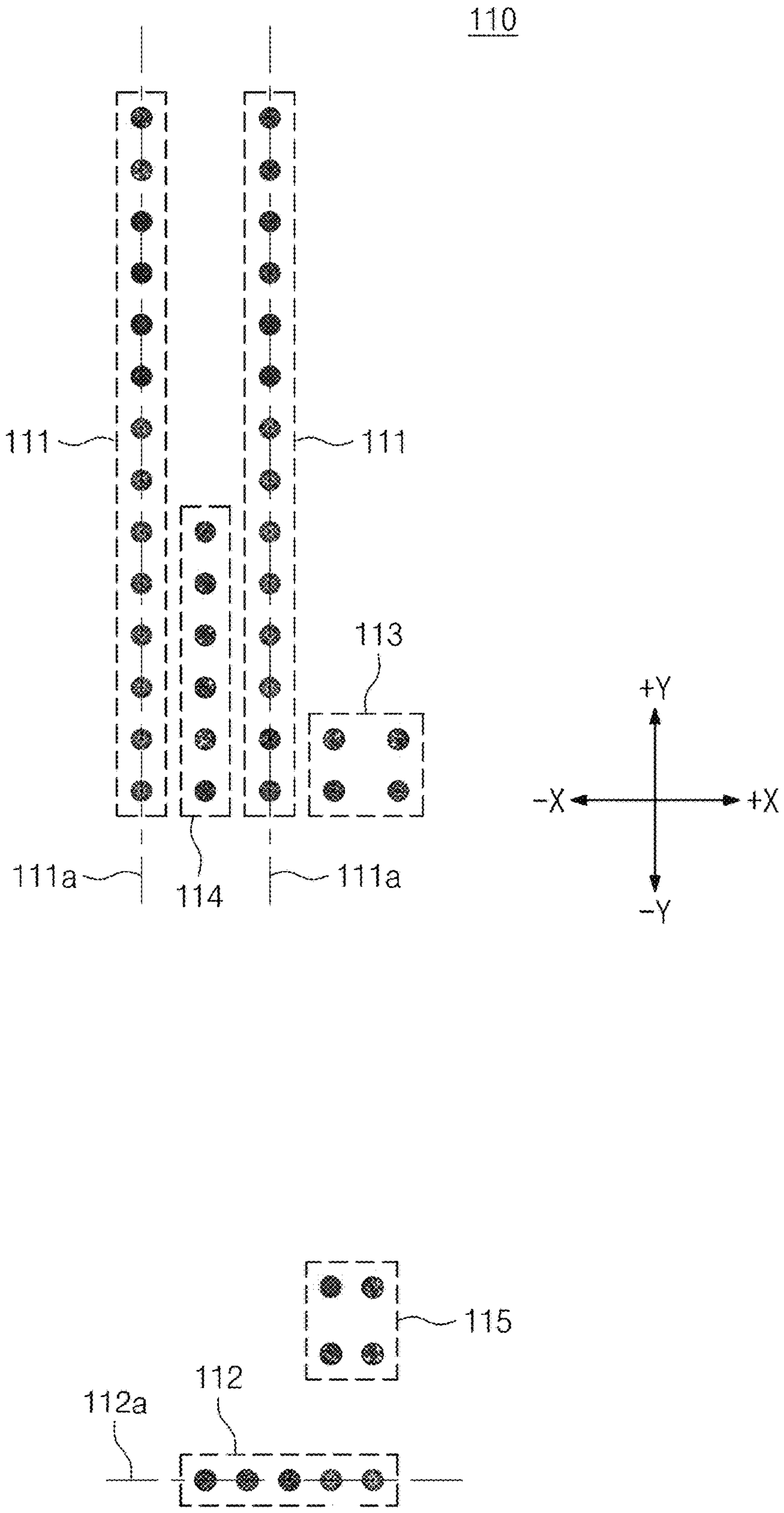
FIG. 4 is a top plan view of a forward pattern illustrated in FIG. 3 enlarged by the vision inspection unit.
Figure 5:
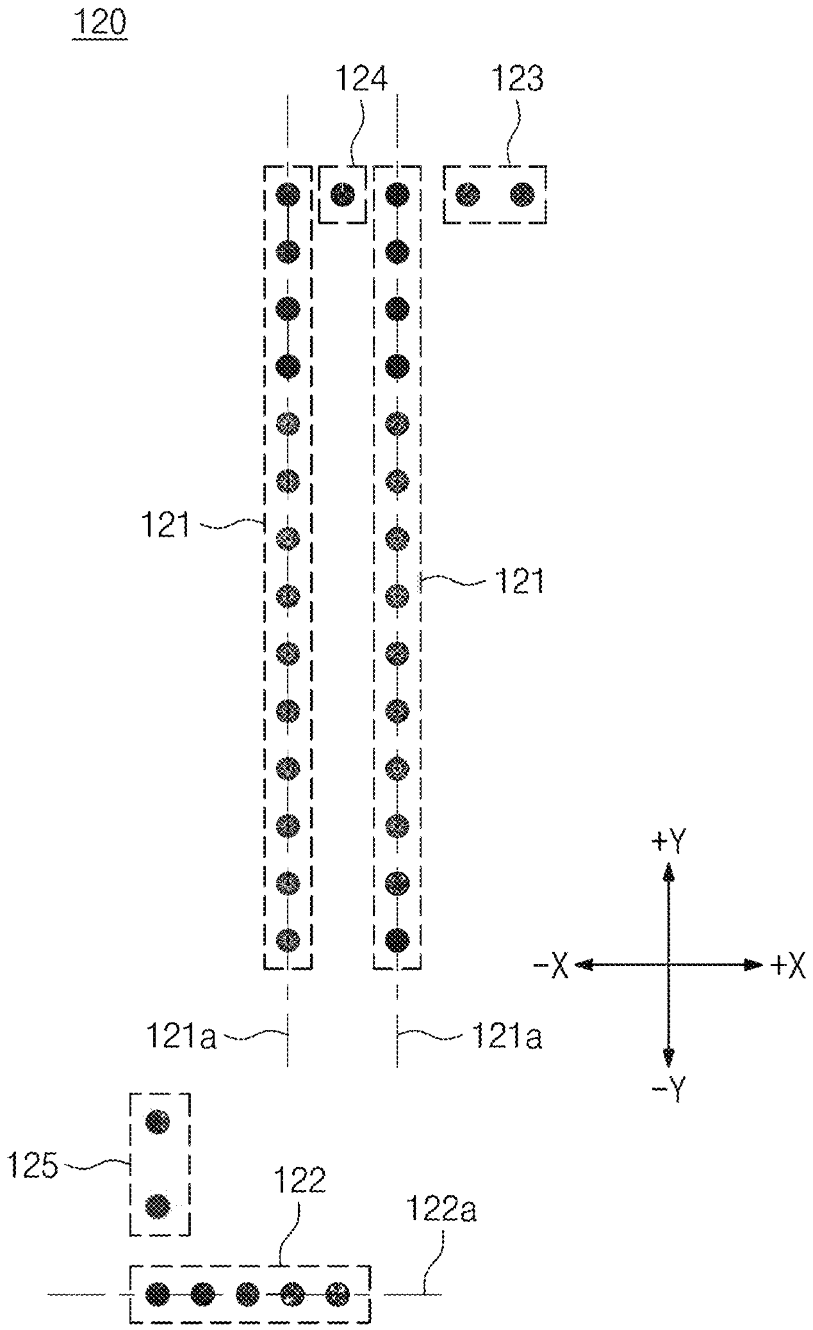
FIG. 5 is a top plan view of a reverse pattern illustrated in FIG. 3 enlarged by the vision inspection unit.

FIG. 1 is a perspective view of a droplet application device according to an exemplary embodiment of the present invention. FIG. 2 is a bottom view of an ink pack within the ink pack assembly illustrated in FIG. 1. FIG. 3 is a top plan view of a test pattern being printed on a substrate illustrated in FIG. 1, enlarged by a vision inspection unit. FIG. 4 is a top plan view of a forward pattern illustrated in FIG. 3 enlarged by the vision inspection unit. FIG. 5 is a top plan view of a reverse pattern illustrated in FIG. 3 enlarged by the vision inspection unit.

As illustrated in FIGS. 1 to 5, a droplet application device according to an exemplary embodiment of the present invention includes an inkjet system 10 and a vision inspection unit 20.

The inkjet system 10 includes an ink pack assembly 11, a pack transfer part 12, and a substrate transfer part 13.

The ink pack assembly 11 includes a plurality of inkjet heads 11*a* formed in the form of an ink pack and combined. Each of the inkjet heads 11*a* is formed with a plurality of nozzles arranged at the bottom, and each of the inkjet heads 11*a* has tens to hundreds of nozzles arranged at the bottom as illustrated in FIG. 2, each of which may discharge ink. In addition, each nozzle discharges ink when receiving an electrical signal according to an input print image value. Further, the inkjet heads 11*a* may be configured to include different colors of ink in respective packs. For example, each of the inkjet heads 11*a* may be formed by selecting one of the colors red, green, and, black. Furthermore, the nozzle may be formed by a piezo method of discharging ink by using a piezo element or a thermal transfer method using a heating element. The ink pack assemblies 11 are coupled to the pack transfer part 12 and are positioned at regular intervals to discharge ink onto a top surface of a substrate w being transferred by the substrate transfer part 13. In the case of the present exemplary embodiment, the direction in which the ink pack assembly 11 moves is in the longitudinal direction of the pack transfer part 12, and will be referred to as the X-axis direction, as illustrated in the drawings. Further, the ink pack assembly 11 may be formed to further include a coupling assembly 11*b* for securing the inkjet head 11*a* in a particular position. However, the present invention is not intended to limit the configuration of the ink pack assembly 11 to the above example, and it is a matter of course that the ink pack assembly 11 may be implemented with various forms to fix a plurality of inkjet heads 11*a* in a particular position.

The pack transfer part 12 is coupled with the ink pack assembly 11 and transfers the ink pack assembly 11 in the X-axis direction. As one example of the pack transfer part 12, the pack transfer part 12 may be formed of a linear motor that travels along a rail in one direction. Furthermore, the pack transfer part 12 may be disposed in the upper space of the substrate transfer part 13 and may be coupled with a base 12*a*, a lower side of which is formed on both sides of the substrate transfer part 13. However, the present invention does not limit the coupling method and the transfer direction of the pack transfer part 12 to the above example, and it is a matter of course that the coupling method and the transfer direction of the pack transfer part 12 may be implemented with various variations depending on the shape of the substrate w or the print direction.

The substrate transfer part 13 holds the substrate w and transfers the substrate w. In this case, the substrate transfer part 13 may transfer the substrate w through driving preset by a substrate transfer control part (not illustrated). On the other hand, in the present exemplary embodiment, the transfer direction of the substrate w is referred to as the Y-axis direction relative to the plane. In this case, the y-axis direction is perpendicular to the x-axis direction. The substrate transfer part 13 moves the substrate w forward and in reverse. Here, the substrate w may be formed as a display substrate, and in the case of the present exemplary embodiment, the substrate w may be formed as a dummy substrate on which a test pattern 100 is printed. In addition, the substrate transfer part 13 may be seated on the top of a faceplate 13*a* and a base 13*b* to reduce vibration and make it movable.

The vision inspection unit 20 is disposed on an upper part of the substrate W, and inspects the alignment state of the test pattern 100 printed on the substrate W to determine the alignment state of the nozzles formed on the inkjet heads 11*a*. The vision inspection unit 20 may include a camera (not illustrated) that acquires analog image information by photographing the test pattern 100, an image processing unit (not illustrated) that converts the analog image information of the camera into digital image information, and an image inspection unit (not illustrated) that inspects the test pattern 100 in the digital image information input from the image processing unit to determine the alignment state of the test pattern 100. The vision inspection unit 20 calculates the amount of change in the angle and the separation error when the alignment state of the test pattern 100 deviates from a preset reference alignment state. However, the present invention does not limit the configuration of the vision inspection unit 20 to the above configuration, and it is a matter of course that the vision inspection unit 20 may be implemented in various configurations in which images can be taken and analyzed.

On the other hand, the pack transfer part 12, the substrate transfer part 13, and the head position adjustment part may be implemented with various variations in the coupling method, movement direction, and the like depending on the printing form of the substrate W, and, of course, other configurations not mentioned may be further configured between the pack transfer part 12, the substrate transfer part 13, and the head position adjustment part as needed. For example, the head position adjustment part 40 may be further formed between the pack transfer part 12 and the substrate transfer part 13 to rotate the pack transfer part 12 or move the pack transfer part 12 in a vertical direction in a plane.

On the other hand, the test pattern 100 prints print direction information on the substrate W to detect the alignment state of the nozzles of the inkjet head 11*a*. In this case, the print direction information in the test pattern 100 includes at least two print direction information. Further, in addition to the print direction information, the test pattern 100 may further include head information for each of the inkjet heads 11*a*, and substrate w direction information for the direction of movement of the substrate w.

Accordingly, the test pattern 100 may be formed to include a forward pattern 110 and a reverse pattern 120.

First, the forward pattern 110 is formed when the substrate w is move forward and transferred in the +Y axis by the substrate transfer part 13.

As one example of the forward pattern 110, the forward pattern 110 includes a first print direction information pattern 111, a second print direction information pattern 112, a first substrate direction pattern 113, a first head information pattern 114, and a second substrate direction pattern 115.

The first print direction information pattern 111 is formed by aligning the dots in a row facing the direction in which the substrate transfer part 13 transfers the substrate W. In the present exemplary embodiment, the direction in which the substrate w is transferred corresponds to the Y-axis direction in the drawing. In this case, the vision inspection unit 20 images the pixel values of the first print direction information pattern 111, calculates the center of each of the dots of the first print direction information pattern 111, linearizes the lines connecting the centers of the dots by numerical interpolation, and calculates the amount of deviation of the angle and the separation value when the direction of the linearized lines deviates by a certain angle from a preset first reference line 111*a*. In this way, when the vision inspection unit 20 calculates the amount of deviation for the angle and separation value of the line with respect to the direction in which the dots of the first print direction information pattern 111 face, the vision inspection unit 20 may know the degree of deviation of the nozzle alignment state of the inkjet heads 11*a* in the Y-axis direction from the reference line.

The second print direction information pattern 112 is formed by aligning the dots in a row in the direction in which the ink pack assembly 11 is transferred. The second print direction information pattern 112 includes dots arranged while facing the direction in which the pack transfer part 12 transfers the ink pack assembly 11. In this exemplary embodiment, the direction in which the ink pack assembly 11 is transferred corresponds to the X-axis direction. In this case, the vision inspection unit 20 calculates the center of each of the dots in the first print direction information pattern 111, linearizes the lines connecting the centers of the dots by numerical interpolation, and calculates the angle when the direction of the linearized lines deviates by a certain angle from a preset second reference line 112*a*. In this way, when the vision inspection unit 20 calculates the amount of deviation for the angle and separation value of the line with respect to the direction in which the dots of the second print direction information pattern 112 face, the vision inspection unit 20 may know the degree of deviation of the alignment state of the substrate W in the X-axis direction from the reference line.

The first substrate direction pattern 113 may have information about the direction of movement of the substrate W when the substrate W is transferred in one direction. For example, the first substrate direction pattern 113 may be configured in the form in which the four dots on one side of the first print direction information pattern 111 are positioned at vertices of a quadrangular shape when the direction of movement of the substrate w is toward the +Y axis. In this case, the first substrate direction pattern 113 is formed by being disposed on one side of the first print direction information pattern 111. In this case, the dots disposed on the lowermost side of the first substrate direction pattern 113 are formed to be disposed in alignment side by side with the dots disposed on the lowermost side of the first print direction information pattern 111, so that the dots disposed on the lowermost side of the first substrate direction pattern 113 may indicate information about the print direction of the first print direction information pattern 111. Accordingly, the vision inspection unit 20 is able to recognize the direction of movement of the substrate W by detecting the first substrate direction pattern 113.

The first head information pattern 114 is formed between the first print direction information patterns 111. In this case, the first print direction information pattern 111 is formed by arranging the dots in at least two rows, and the first head information pattern 114 is formed between the first print direction information patterns 111 formed of the two rows of dots. The first head information pattern 114 is formed in a different form for each inkjet head 11*a*, such that the first head information pattern 114 displays information about which inkjet head 11*a* printed the first print direction information pattern 111. Accordingly, the vision inspection unit 20 may recognize the first head information pattern 114 when analyzing the first print direction information pattern 111 to know which inkjet head 11*a* printed the test pattern 100, so that in the event that the alignment state of the first print direction information pattern 111 deviates from the reference line, the nozzle alignment state of the corresponding inkjet head can be known by looking at the first head information pattern 114.

Here, as described above, the first head information pattern 114 is formed between the first print direction information patterns 111, which are formed in two rows, so as to be separated from the first print direction information patterns 111 but disposed along with the first print direction information patterns 111. In this case, the total length of the dots forming the first head information pattern 114 is formed to be less than the total length of the dots forming the first print direction information pattern 111. Thus, the first head information pattern 114 and the first print direction information pattern 111 may be integrally formed in a state of separation from each other.

The second substrate direction pattern 115 has information about the movement direction of the substrate W when the substrate W is transferred in one direction, and is formed on one side of the second print direction information pattern 112. For example, the second substrate direction pattern 115 may be configured in the form in which the four dots on one side of the second print direction information pattern 112 are positioned at vertices of a quadrangular shape when the direction of movement of the substrate w is toward the +Y axis. In this case, the second substrate direction pattern 115 is formed by being disposed on one side of the second print direction information pattern 112. In this case, the dots disposed on the lowermost side of the second substrate direction pattern 115 are formed to be disposed in alignment side by side with the dots disposed on the lowermost side of the second print direction information pattern 112, so that the dots disposed on the lowermost side of the first substrate direction pattern 113 may indicate information about the print direction of the second print direction information pattern 112. Accordingly, the vision inspection unit 20 is able to recognize the direction of movement of the substrate W by detecting the second substrate direction pattern 115.

The reverse pattern 120 is formed when the substrate w move in reverse and transferred in the −Y axis by the substrate transfer part 13. Further, the reverse pattern 120 is formed spaced apart from the forward pattern 110 toward the Y-axis, so that the forward pattern 110 and the reverse pattern 120 are printed in a straight line. Thus, the vision inspection unit 20 is able to inspect both the forward pattern 110 and the reverse pattern 120 formed on the straight line when the substrate W is transferred.

In one example of the reverse pattern 120, the reverse pattern 120 includes a third print direction information pattern 121, a fourth print direction information pattern 122, a third substrate direction pattern 123, a second head information pattern 124, and a fourth substrate direction pattern 125.

Here, the third print direction information pattern 121 performs the same function as the first print direction information pattern 111, and the fourth print direction information pattern 122 performs the same function as the second print direction information pattern 112. In addition, the third substrate direction pattern 123 performs the same function as the first substrate direction pattern 113, and the fourth substrate direction pattern 125 performs the same function as the second substrate direction pattern 115. Therefore, in the present description, the redundant description of the third print direction information pattern 121, the fourth print direction information pattern 122, the third substrate direction pattern 123, the second head information pattern 124, and the fourth substrate direction pattern 125 will be omitted, and only the differences will be described.

Here, the vision inspection unit 20 presets a third reference line 121*a* on the direction of movement of the substrate W and a fourth reference line 122*a* on the direction of movement of the ink pack assembly 11. In this case, the third reference line 121*a* is formed perpendicular to the fourth reference line 122*a*. In this case, the vision inspection unit 20 inspects the deviation of the nozzle of the inkjet head 11*a* by computing a deviation amount by comparing a line connecting the centers of the dots forming the third print direction information pattern 121 with the third reference line 121*a*, and computing a deviation amount by comparing a line connecting the centers of the dots forming the fourth print direction information pattern 122 with the fourth reference line 122*a*. In this case, the vision inspection unit 20 recognizes the direction of movement of the substrate W by detecting the third substrate direction pattern 123 and the fourth substrate direction pattern 125, and recognizes the second head information pattern 124 to recognize which inkjet head 11*a* printed the test pattern 100.

As such, the patterns for the detail configurations configuring the reverse pattern 120 are configured to perform the same function as the detail patterns of the forward pattern 110, but are formed when the substrate W is transferred in reverse, and are used to check the alignment state of the inkjet head 11A with respect to the reverse direction.

Thus, the droplet application device according to the exemplary embodiment of the present invention may inspect the nozzle alignment state of the respective inkjet heads 11*a* and the deviation of the substrate w at the time of forward movement by forming the forward pattern 110 by which the deviation of the substrate with respect to each of the X and Y axes may be checked when the substrate w moves forward in the +Y axis, and inspect the nozzle alignment state of the respective inkjet heads 11*a* and the deviation of the substrate w at the time of reverse movement by forming the reverse pattern 120 by which the deviation of the substrate with respect to each of the X and Y axes may be checked when the substrate w moves forward in the −Y axis.

The following describes a droplet application method of the present invention as described above.

Figure 6:
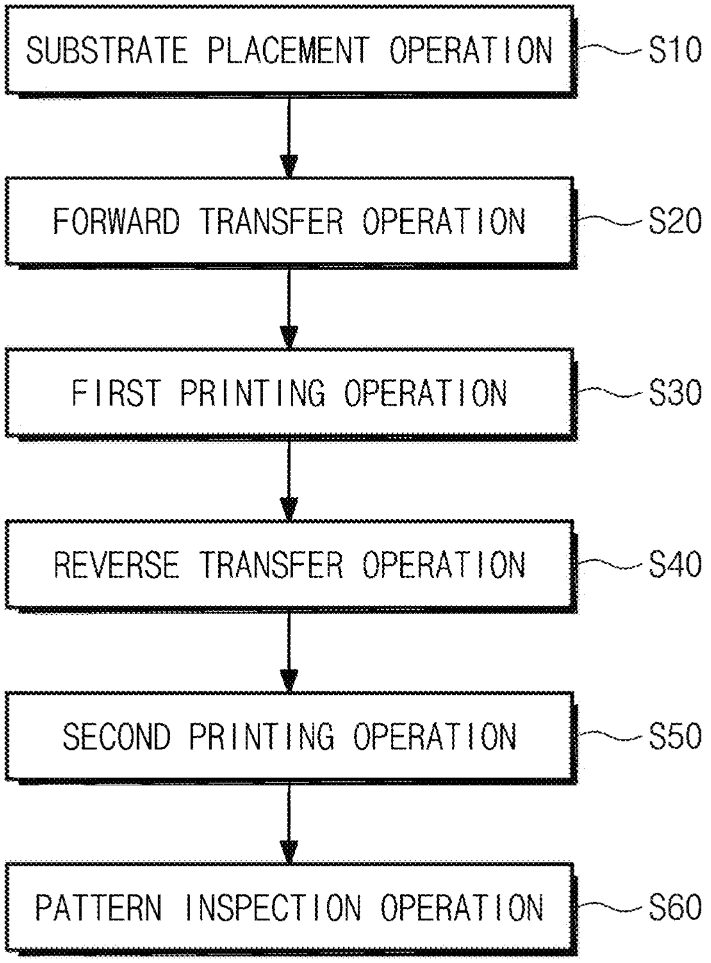
FIG. 6 is a flowchart of a droplet application method according to an exemplary embodiment of the present invention.

FIG. 6 is a flowchart of a droplet application method according to an exemplary embodiment of the present invention.

Referring further to FIG. 6, a droplet application method according to an exemplary embodiment of the present invention includes a substrate placement operation S10, a forward transfer operation S20, a first printing operation S30, a reverse transfer operation S40, a second printing operation S50, and a pattern inspection operation S60.

First, in the substrate placement operation S10, the substrate transfer part 13 is placed on the substrate w. In this case, the substrate w may be placed at a preset position by a transfer robot (not illustrated).

Then, in the forward transfer operation S20, the substrate transfer part 13 transfers the substrate w in one direction. In the case of the present exemplary embodiment, in the forward transfer operation S20, the substrate w is transferred toward the +Y axis.

Next, in the first printing operation S30, the inkjet heads 11*a* of the ink pack assembly 11 discharge ink from their respective nozzles to print a forward pattern 110, which includes information about a transfer direction of the substrate w and a transfer direction of the ink pack assembly 11. In the first printing operation S30, the patterns to be printed are the first print direction information pattern 111, the second print direction information pattern 112, the first substrate direction pattern 113, the first head information pattern 114, and the second substrate direction pattern 115 described above.

Next, in the reverse transfer operation S40, the substrate transfer part 13 transfers the substrate w in the other direction. In the present exemplary embodiment, in the reverse transfer operation S40, the substrate w is transferred toward the −Y axis.

Next, in the second printing operation S50, the inkjet heads 11*a* of the ink pack assembly 11 discharge ink to print a reverse pattern 110, which includes information about a transfer direction of the substrate w and a transfer direction of the ink pack assembly 11. In the second printing operation S50, the patterns to be printed are the third print direction information pattern 121, the fourth print direction information pattern 122, the third substrate direction pattern 123, the second head information pattern 124, and the fourth substrate direction pattern 125 described above.

Next, in the pattern inspection operation S60, the vision inspection unit 20 inspects the forward pattern 110 and the reverse pattern 120 to inspect the alignment state of the inkjet head 11*a* and the alignment state of the substrate w. At this time, in the pattern inspection operation S60, the vision inspection unit 20 compares the first print direction information pattern 111 with the first reference line 111*a*, compares the second print direction information pattern 112 with the second reference line 112*a*, and inspects deviation of the substrate W and the nozzles of the inkjet head 11A in the state in which the substrate W moves forward, as described above.

At this time, in the pattern inspection operation S60, as described above, the vision inspection unit 20 detects the first substrate direction pattern 113 when inspecting the first print direction information pattern 111 to obtain information about the state in which the substrate w moves forward, and detects the second substrate direction pattern 115 when inspecting the second print direction information pattern 112 to obtain information about the forward movement state of the substrate w. Further, in the pattern inspection operation S60, the vision inspection unit 20 detects the first head information pattern 114 and obtains the identification information of the inkjet head 11*a*. In this way, when the substrate w moves forward in the +Y axis, the vision inspection unit 20 checks the print direction in the X and Y axes to inspect the deviation of the substrate w and the nozzles of the inkjet head 11*a*.

Similarly, in the pattern inspection operation S60, as described above, the vision inspection unit 20 detects the third substrate direction pattern 123 when inspecting the third print direction information pattern 121 to obtain information about the state in which the substrate w moves forward, and detects the fourth substrate direction pattern 125 when inspecting the fourth print direction information pattern 122 to obtain information about the forward movement state of the substrate w. Further, in the pattern inspection operation S60, the vision inspection unit 20 detects the second head information pattern 124 and obtains the identification information of the inkjet head 11*a*. In this way, when the substrate w moves in reverse in the −Y axis, the vision inspection unit 20 checks the print direction in the X and Y axes to inspect the deviation of the substrate w and the nozzles of the inkjet head 11*a*.

As described above, the present invention has been described with reference to the specific matters, such as a specific component, limited exemplary embodiments, and drawings, but these are provided only for helping general understanding of the present invention, and the present invention is not limited to the aforementioned exemplary embodiments, and those skilled in the art will appreciate that various changes and modifications are possible from the description.

Therefore, the spirit of the present invention should not be limited to the described exemplary embodiments, and it will be the that not only the claims to be described later, but also all modifications equivalent to the claims belong to the scope of the present invention.

What is claimed is:

1. A droplet application device comprising:

an inkjet system including an ink pack assembly having inkjet heads, a pack transfer part and a substrate transfer part, the inkjet system being configured to discharge ink from each of the inkjet heads onto a substrate to print a test pattern while the substrate is on the substrate transfer part, the pack transfer part being configured to transfer the ink pack assembly, and the substrate transfer part being configured to transfer the substrate; and a vision inspector configured to determine an alignment state of the inkjet heads by inspecting direction information of the test pattern printed on the substrate, the direction information identifying two or more directions, wherein the test pattern includes a forward pattern formed when the substrate transfer part transfers the substrate in a first direction, the two or more directions including the first direction; and a reverse pattern formed when the substrate transfer part transfers the substrate in an opposite direction to the first direction, the two or more directions including the opposite direction to the first direction-, wherein the substrate transfer part is further configured to transfer additional substrates across a printing region, and the inkjet heads being configured to discharge the ink within the printing region, during a normal operational use of the droplet application device.

2. The droplet application device of claim 1, wherein the forward pattern is formed when the substrate is transferred forward by the substrate transfer part, and the reverse pattern is formed when the substrate is transferred in reverse by the substrate transfer part.

3. The droplet application device of claim 1, wherein the forward pattern includes a first print direction information pattern formed in the first direction.

4. The droplet application device of claim 3, wherein the first print direction information pattern is formed by aligning dots in a row in the first direction.

5. The droplet application device of claim 4, wherein the forward pattern further includes a second print direction information pattern formed in a second direction in which the pack transfer part transfers the ink pack assembly, the two or more directions including the second direction.

6. The droplet application device of claim 5, wherein the second print direction information pattern is formed by aligning dots in a row in a third direction in which the ink pack assembly is transferred, the two or more directions including the third direction.

7. The droplet application device of claim 6, wherein the vision inspector is configured to form a first reference line for a movement direction of the ink pack assembly and a second reference line for a movement direction of the substrate transfer part to be perpendicular to the first reference line, the vision inspector being configured to calculate a deviation amount by comparing a line connecting centers of dots forming the first print direction information pattern with the first reference line, and calculates a deviation amount by comparing a line connecting centers of dots forming the second print direction information pattern with the second reference line to inspect deviation of each of the inkjet heads.

8. The droplet application device of claim 7, wherein the forward pattern further includes a first substrate direction pattern that includes information about a movement direction of the substrate when the substrate is transferred in the first direction, and is formed on one side of the first print direction information pattern.

9. The droplet application device of claim 8, wherein the first print direction information pattern is formed by arranging the dots in at least two rows, and the forward pattern further includes a first head information pattern formed between the first print direction information pattern.

10. The droplet application device of claim 9, wherein a total length of dots forming the first head information pattern is formed to be less than a total length of dots forming the first print direction information pattern.

11. The droplet application device of claim 8, wherein the forward pattern further includes a second substrate direction pattern that includes information about a movement direction of the substrate when the substrate is transferred in the first direction, and is formed on one side of the second print direction information pattern.

12. The droplet application device of claim 11, wherein the reverse pattern includes a third print direction information pattern that is formed toward an opposite direction to the first direction in which the substrate transfer part transfers the substrate, and formed by aligning dots in a row in the first direction.

13. The droplet application device of claim 12, wherein the reverse pattern further includes a fourth print direction information pattern that is formed toward the second direction in which the pack transfer part transfers the ink pack assembly and formed by aligning dots in a row in the direction in which the ink pack assembly is transferred, the two or more directions including the second direction.

14. The droplet application device of claim 13, wherein the vision inspector is configured to form a third reference line for a movement direction of the ink pack assembly and a fourth reference line for a movement direction of the substrate transfer part to be perpendicular to the third reference line, the vision inspector being configured to calculate a deviation amount by comparing a line connecting centers of dots forming a third print direction information pattern with the third reference line, and calculate a deviation amount by comparing a line connecting centers of dots forming the fourth print direction information pattern with the fourth reference line to inspect deviation of each of the inkjet heads.

15. The droplet application device of claim 13, wherein the reverse pattern further includes a third substrate direction pattern that includes information about a movement direction of the substrate when the substrate is transferred in the opposite direction to the first direction and is formed on one side of a third print direction information pattern, and a fourth substrate orientation pattern that includes information about a movement direction of the substrate when the substrate is transferred in the opposite direction to the first direction and is formed on one side of the fourth print direction information pattern.

16. The droplet application device of claim 13, wherein a third print direction information pattern is formed by arranging the dots in at least two rows, and the reverse pattern further includes a second head information pattern formed between the third print direction information pattern.

17. A droplet application device comprising:

an inkjet system including an ink pack assembly having inkjet heads, a pack transfer part and a substrate transfer part, the inkjet heads being configured to discharge ink from each of the inkjet heads onto a substrate to print a test pattern while the substrate is on the substrate transfer part, the pack transfer part being configured to transfer the ink pack assembly, and the substrate transfer part being configured to transfer the substrate; and a vision inspector being configured to determine an alignment state of the inkjet heads by inspecting print direction information of the test pattern printed on the substrate, the print direction information identifying two or more directions, wherein the test pattern includes a forward pattern formed when the substrate transfer part transfers the substrate in a first direction, the two or more directions including the first direction; and a reverse pattern formed when the substrate transfer part transfers the substrate in an opposite direction to the first direction, the two or more directions including the opposite direction to the first direction, the forward pattern includes a first print direction information pattern formed in a direction in which the substrate transfer part transfers the substrate and formed by aligning dots in a row in a first direction in which the substrate is transferred, a second print direction information pattern formed in a second direction in which the pack transfer part transfers the ink pack assembly and formed by aligning dots in a row in the direction in which the ink pack assembly is transferred, a first substrate direction pattern that includes information about a movement direction of the substrate when the substrate is transferred in the first direction, and is formed on one side of the first print direction information pattern, a second substrate direction pattern that includes information about a movement direction of the substrate when the substrate is transferred in the first direction, and is formed on one side of the second print direction information pattern, and a first head information pattern formed between two rows of dots of the first print direction information pattern, in which a total length of dots forming the first head information pattern is formed to be less than a total length of dots forming the first print direction information pattern, the reverse pattern includes a third print direction information pattern that is formed toward the opposite direction to the first direction in which the substrate transfer part transfers the substrate, and formed by aligning dots in two rows in the direction in which the substrate is transferred, a fourth print direction information pattern that is formed toward the second direction in which the pack transfer part transfers the ink pack assembly and formed by aligning dots in a row in the direction in which the ink pack assembly is transferred, a third substrate direction pattern that includes information about a movement direction of the substrate when the substrate is transferred in the opposite direction to the first direction and is formed on one side of the third print direction information pattern, a fourth substrate orientation pattern that includes information about a movement direction of the substrate when the substrate is transferred in the opposite direction to the first direction and is formed on one side of the fourth print direction information pattern, and a second head information pattern formed between two rows of dots of the third print direction information pattern, in which a total length of dots forming the second head information pattern is formed to be less than a total length of dots forming the third print direction information pattern, the vision inspector being configured to form a first reference line for the movement direction of the ink pack assembly and a second reference line for the movement direction of the substrate transfer part to be perpendicular to the first reference line, the vision inspector being configured to calculate a deviation amount by comparing a line connecting centers of the dots forming the first print direction information pattern with the first reference line, and calculate a deviation amount by comparing a line connecting the centers of the dots forming the second print direction information pattern with the second reference line to inspect deviation of each of the inkjet heads, and the vision inspector forms a third reference line for the movement direction of the ink pack assembly and a fourth reference line for the movement direction of the substrate transfer part to be perpendicular to the third reference line, and the vision inspector is configured to calculate a deviation amount by comparing a line connecting the centers of the dots forming the third print direction information pattern with the third reference line, and calculate a deviation amount by comparing a line connecting the centers of the dots forming the fourth print direction information pattern with the fourth reference line to inspect deviation of each of the inkjet heads, wherein the substrate transfer part is further configured to transfer additional substrates across a printing region, and the inkjet heads being configured to discharge the ink within the printing region, during a normal operational use of the droplet application device.

* * * * *